United States Patent [19]
Yui

[11] Patent Number: 5,390,331
[45] Date of Patent: Feb. 14, 1995

[54] DATA PROCESSING DEVICE WHICH PROCESSES DATA IN ACCORDANCE WITH AN APPLICATION PROGRAM STORED IN A MEMORY DEVICE WHICH IS REMOVABLY CONNECTED WITH THE DATA PROCESSING DEVICE

[75] Inventor: Takaaki Yui, Houya, Japan

[73] Assignee: Casio Computer Co., Ltd., Tokyo, Japan

[21] Appl. No.: 24,818

[22] Filed: Mar. 1, 1993

Related U.S. Application Data

[63] Continuation of Ser. No. 522,207, May 11, 1990, abandoned.

[30] Foreign Application Priority Data

Jun. 20, 1989 [JP] Japan .................................. 1-155684

[51] Int. Cl.⁶ .............................................. G06F 7/02
[52] U.S. Cl. .................................. 395/700; 364/259.2; 364/280.2
[58] Field of Search ................................ 395/650, 700

[56] References Cited

U.S. PATENT DOCUMENTS 4,105,156  8/1978  Dethloff .
4,523,297  6/1985  Ugon et al. .
4,890,832  1/1990  Komaki .................................. 341/23

FOREIGN PATENT DOCUMENTS 0155690  9/1985  European Pat. Off. .
1930338  12/1970  Germany .

OTHER PUBLICATIONS

European Search Report.
Patent Abstracts of Japan, vol. 7, No. 231 (p. 229)-J-P-A-58 120 247.
Cortesi, Inside Concurrent CP/M, 1984, pp. 4–5.

Primary Examiner—Kevin A. Kriess
Assistant Examiner—John Q. Chavis
Attorney, Agent, or Firm—Frishauf, Holtz, Goodman & Woodward

[57] ABSTRACT

Various calculations and also games are executed when one of memory devices, for instance, IC cards into which various application programs have been stored is electrically connected to a data processing device. The respective memory devices store ID codes preselected to the sorts thereof. The data processing device compares the ID code used in the previous data processing operation with the ID code being used in the present data processing operation while executing the application program of the memory device, and judges whether or not the same memory device is being electrically connected to the data processing device. When a judgement is made that the different memory device is electrically connected, the memory content of the memory for executing the application program employed in the data processing device is cleared, and another program of the memory device newly connected to the data processing device is performed with employment of the memory the content of which has been cleared.

2 Claims, 3 Drawing Sheets

DATA PROCESSING DEVICE WHICH PROCESSES DATA IN ACCORDANCE WITH AN APPLICATION PROGRAM STORED IN A MEMORY DEVICE WHICH IS REMOVABLY CONNECTED WITH THE DATA PROCESSING DEVICE

This application is a continuation of application Ser. No. 07/522,207, filed May 11, 1990, now abandoned.

BACKGROUND OF THE INVENTION

1. Field of the Invention

The present invention relates to a data processing system constructed of an external storage medium for previously storing a program, and also an electronic apparatus capable of connecting the external storage medium and performing the program stored therein.

2. Description of the Prior Art

Very recently, there are commercially available such compact information processing apparatuses that an external storage medium, for instance, an IC (integrated circuit) card is connectable to an apparatus body, under which a program previously stored in the IC card can be executed.

In case that an optional software previously stored in the IC card is used in such an information processing apparatus, a work area, normally a random access memory (RAM) is required to perform the software process. Accordingly, apparatus has been developed where a work area exclusively used for each IC card is employed inside the information processing apparatus body, a work area commonly used for a software of each IC card is provided within the information processing apparatus, and, another work area used to process software is formed inside the IC card.

However, one conventional information processing apparatus in which the memory (RAM) employed therein has been allocated as work areas exclusively used for the respective IC cards (namely, exclusively used for processing the softwares of the respective IC cards), has such a drawback that the utilization efficiency of RAM is lowered since the work area cannot be used for processing any software other than the previously designated software. In another conventional information processing apparatus in which the work areas commonly employed for the respective IC cards have been provided, the memory data may be destroyed when a different software is executed by substituting the present IC card with another IC card. To avoid such a problem, contents of the common memory are once cleared before executing the software of the different IC card. However, this clear operation may require complex manipulation, and also may impede easy operations. For instance, even when the same IC card is loaded, the contents of the common memory are subjected to be cleared, so that the software process cannot be continued while maintaining the previous operating condition. Furthermore, the cost of the conventional IC card where RAM has been employed as the work area is rather expensive, in view of economical reasons.

SUMMARY OF THE INVENTION

The present invention has been made in an attempt to solve the above-described conventional drawbacks, and therefore has an object to provide an information processing apparatus which can be widely utilized with easy operations and reasonable cost.

The above-described object and other features of the present invention may be achieved by providing a data processing system comprising:

a memory device including:
  means for previously storing an application program;
  means for storing an ID (identification) code predetermined by a sort of the memory device; and, a data processing device including:
  means for executing the application program stored in the memory device;
  memory means used for performing the application program;
  comparing means for comparing the ID codes with each other;
  control means for reading out the ID code from the ID code storing means employed in the memory device before executing the application program so as to supply the readout ID code to the comparing means, whereby said readout ID code is compared with a previously readout ID code; and,
  means for clearing memory contents of said memory means in case that there is no coincidence checked by said comparing means.

In the data processing system according to the present invention, the work area of the memory employed in the data processing apparatus is cleared only when there is no coincidence between the identification code stored in the identification code storing means and the identification code directly read out from the external storage medium. Accordingly, the information process may be continued while maintaining the previous memory condition of the work area even when the main power is turned on unless one storage medium is substituted by another storage medium. This implies that the data processing apparatus can be operated as if an exclusively used area would be formed in the work area of the memory under the condition that the same storage medium is continuously used therein. On the other hand, when the different external storage mediums are used, since the comparison result of the identification codes becomes noncoincident and thus the work area of the memory is cleared, the work area may be utilized as a common memory area with respect to each of the different storage media, and accordingly RAM may be efficiently utilized.

BRIEF DESCRIPTION OF THE DRAWINGS

For a better understanding of the present invention, reference is made to the descriptions in conjunction with the accompanying drawings, in which.

DETAILED DESCRIPTION OF THE PREFERRED EMBODIMENTS

CONSTRUCTION OF INFORMATION PROCESSING APPARATUS

Figure 1:
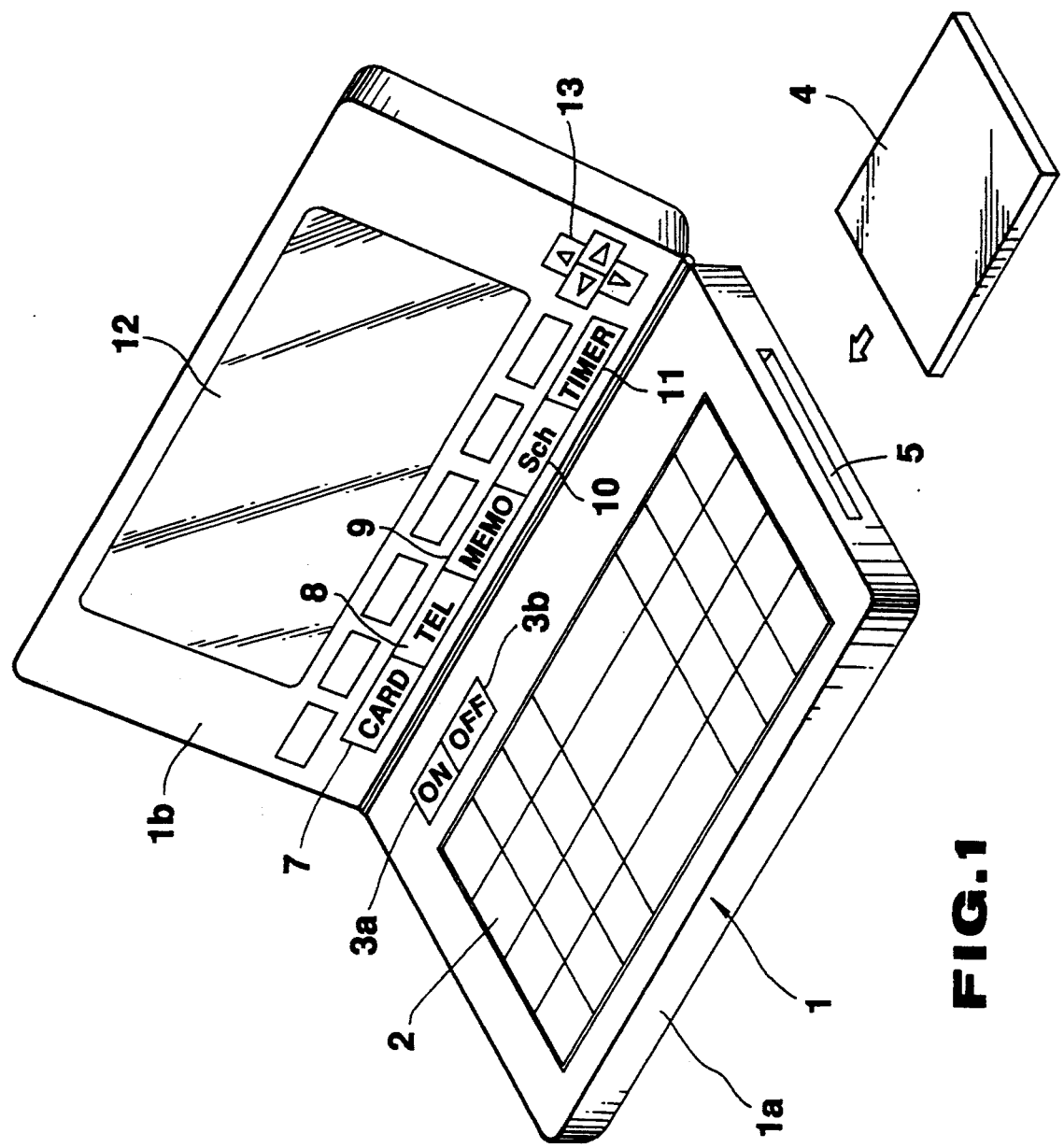
FIG. 1 is a perspective view of an information processing apparatus according to one preferred embodiment of the present invention.

In FIG. 1, there is shown a perspective view of an information processing apparatus according to one preferred embodiment of the present invention.

In FIG. 1, reference numeral 1 indicates an apparatus body which is constructed of a main body 1a and a lid 1b hinged to this base body 1a. A keyboard 2 is formed on a surface of the main body 1a. The keyboard 2 is arranged by character keys, numerical keys, and instruction keys. Furthermore, a key 3a for turning on main power, and a key 3b for turning off the main power are provided on the main body 1a, and also a card loading unit 5 for loading an IC (integrated circuit) card 4 is formed on one side surface thereof. On the other hand, the lid 1b includes keys for setting an operation mode of the appliance on a surface thereof. These keys are a "CARD" key 7 for setting a card mode; a "TEL" key 8 for setting a telephone mode; a "MEMO" key 9 for setting a memo mode; a "Sch" key 10 for setting a schedule mode; and, a "TIMER" key 11 for setting a timer mode. Also, a liquid crystal display unit 12 for displaying various data is formed on the lid 1b. Reference numeral 13 indicates cursor moving keys for moving a cursor displayed on the display unit 12.

CIRCUIT ARRANGEMENT OF INFORMATION PROCESSING APPARATUS

Figure 2:
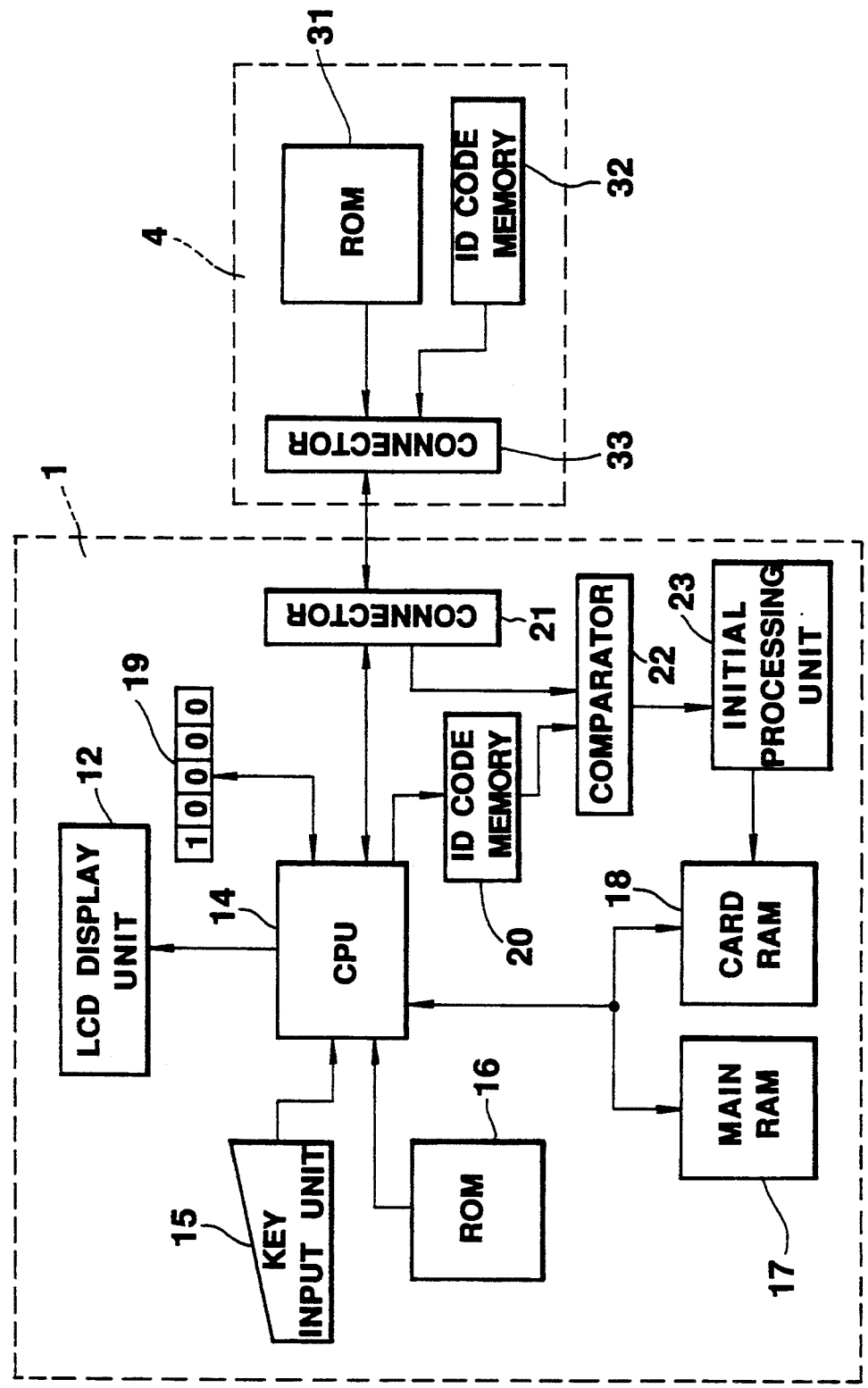
FIG. 2 is a schematic block diagram of a circuit arrangement of the information processing apparatus shown in FIG. 1, and, FIG. 3 is a flowchart for explaining operations of the information processing apparatus shown in FIG. 1.

FIG. 2 is an overall circuit arrangement of the information processing apparatus shown in FIG. 1. In the apparatus body 1, a key input unit 15, ROM (read-only memory) 16, main RAM (random access memory) 17, card RAM 18, a mode flag memory 19, an ID (identification) code memory 20, a connector 21, and the liquid crystal display unit 12 are connected to CPU 14.

It should be noted that the above-described key input unit 15 corresponds to the keyboard 2, and various keys 7 to 11 and 13. ROM 16 previously stores a program to control the various functions of the apparatus body 1 and another program to control the IC card 4. Main RAM 17 temporarily stores various data when the functions of the apparatus body 1 are under control. Furthermore, card RAM 18 (work memory) is used to process an application program data on the IC card 4. The function of the mode flag memory 19 is to store the modes set by the appliance. The memory capacity of this mode flag memory 19 is selected to be 5 bits. Flags are set in this mode flag memory 19 in response to the above-described "CARD" key 7, "TEL" key 8, "MEMO" key 9, "Sch" key 10 and "TIMER" key 11. In this preferred embodiment, the content of this mode flag memory 19 is set to "10000" which implies that the card mode has been set by operating the "CARD" key 7. It should be noted that the content of the mode flag memory 19 is maintained even when the main power is turned off. The ID code memory 20 stores the ID code which has been given to the IC card 4 under predetermined conditions.

A function of a comparator unit 22 is to compare the ID code stored in the ID code memory 20 with the ID code read out from the IC card 4 via the connectors 21 and 33. The comparison result is supplied to an initial processing unit 23. The function of this initial processing unit 23 is to clear the memory content of the card RAM 18 when the comparator unit 22 judges that there is no coincidence between the above-described ID codes.

On the other hand, the IC card 4 is constructed of ROM 31, an ID code memory 32, and the connector 33. ROM 31 previously stores an application software program determined by the sort of the IC card 4. The ID code memory 32 stores such an ID (identification) code preselected by the sort of the IC card 4. The function of the connector 33 is to connect the IC card 4 to the apparatus body 1 via another connector 21.

DATA PROCESSING OPERATIONS

The data processing operations of the information processing apparatus 1 with the above-described circuit arrangement will now be described with reference to FIG. 2 and also a flowchart shown in FIG. 3.

Figure 3:
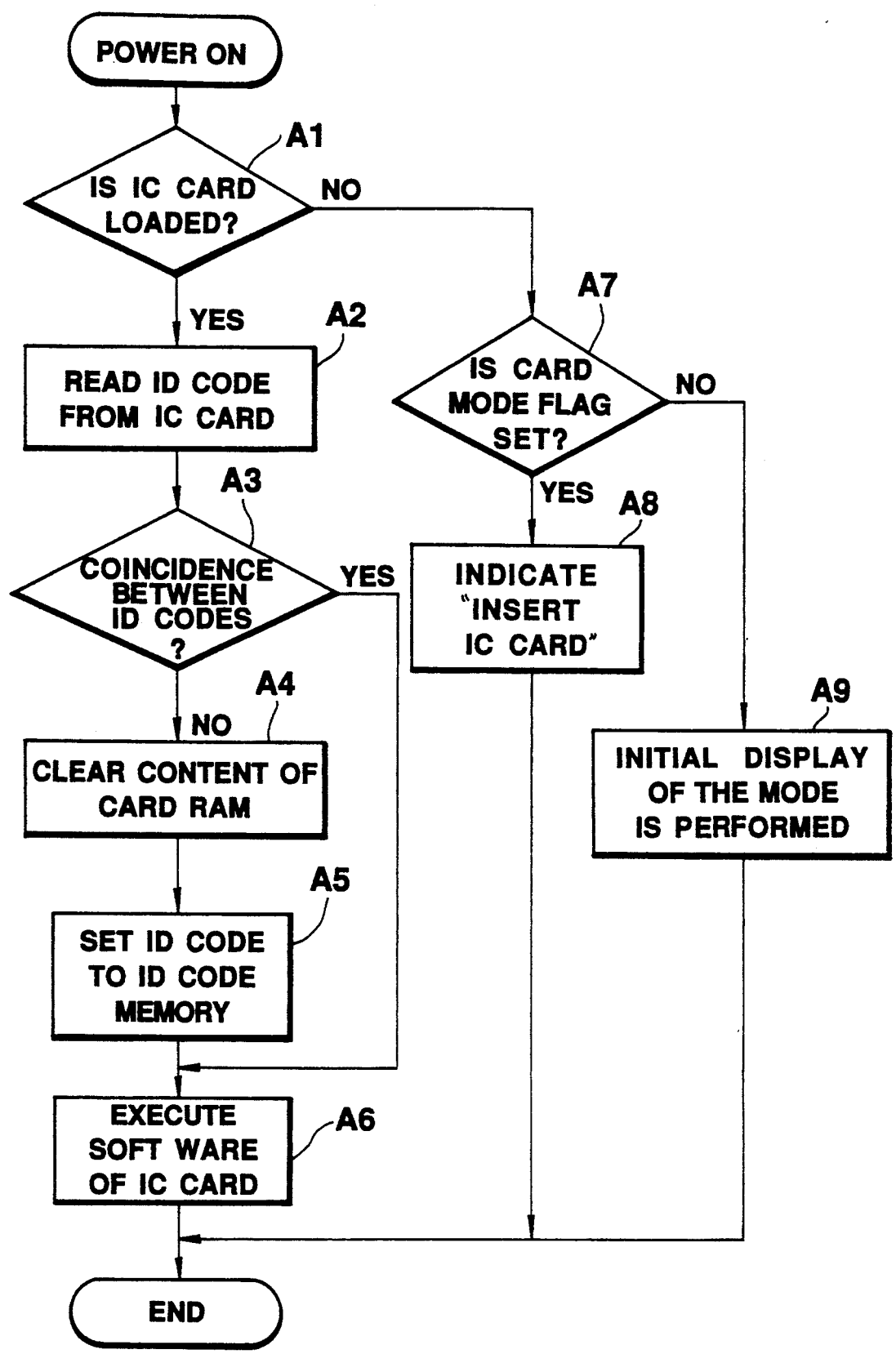

When the main power is turned on by manipulating the power-on key 3a, a series of operations as defined in the flowchart shown in FIG. 3 are performed. At a step A1, a judgement is made whether or not the IC card 4 is connected to the apparatus body 2. If YES, i.e., when the IC card 4 is loaded to the card loading unit 5 of the apparatus body 1, the process is advanced to a step A2. At this step A2, the ID code stored in the ID code memory 32 employed in the IC card 4 is read out. Then, this ID code of the IC card 4 is furnished to the comparator unit 22 employed in the apparatus body 1, and then is compared with the content of the ID code memory 20 employed in the apparatus body i at a step A3. When the ID card 4 is newly loaded on the apparatus body 1, the judgement result becomes NO, and thus the process is advanced to a step A4. At this step A4, since the noncoincident output made by the comparator unit 22 is supplied to the initial processing unit 23, the content of the card RAM 18 is cleared. Subsequently, the process is advanced to a step A5 in which another ID code read out from the ID code memory 32 employed in the IC card 4 is set to the ID code memory 20. Then, the process is advanced to a step A6. At this step A6, the flag of the card mode is set to the mode flag memory 19. After "10000" has been set to the mode flag memory 19, as represented in FIG. 2, the process defined by the optional application software program previously stored in ROM 31 of the IC card 4 is executed. The card data process in this case is performed with the card RAM 18, the content of which has been cleared at the previous step A4.

Then, after the execution of the application program stored in the loaded IC card 4 has been accomplished or interrupted and the main power is turned off by operating the power off key 3b, in case the execution of the application program is restarted without the substitution of the loaded IC card 4, the power-on key 3a is manipulated to turn on the main power. Then, a judgement is made YES at the step A1, the ID code is read out from the IC card 4 at the step A2, and subsequently, a judgement is made whether or not this ID code of the IC card 4 is coincident with the content of the ID code memory 20 employed in the apparatus body 1. In this judgement, the coincidence is made, i.e., YES, and immediately the process is advanced to a step A6. At this step A6, the content of the card RAM 18 (work memory) is not cleared and the process can be continued while maintaining the previous data processing conditions. As a result, when, for instance, a game software is used as this application software program of the IC card 4, this game can be continued under the conditions just after the power-off key 3b was operated.

To the contrary, in the case where the IC card 4 is not loaded on the card loading unit 5 of the apparatus body 1 and a judgement is made NO at the step A1, the process is advanced to a step A7. At the step A7, a check is made whether or not the flag of the card mode has been set into the mode flag memory 19. When the content of the mode flag memory 19 has been set to "10000" as shown in FIG. 2, and the flag of the card mode has been also set, a judgement is made YES and the process is advanced to a further step A8. At this step A8, an indication "INSERT CARD" is made on the display unit 12 and then the process is completed. On the other hand, at the previous step A7, if NO, then the process is advanced to a step A9. At this step A9, the initial display of the mode corresponding to the flag which has been set to the mode flag memory 19 is performed and the process is accomplished.

What is claimed is:

1. A data processing system which processes data in accordance with an application program stored in a memory device, comprising:
   a memory device including:
      program storing means for previously storing the application program, and
      first ID code storing means for storing a first identification code corresponding to said application program stored in said program storing means;
   a data processing device in which said memory device is detachably installed, said data processing device including:
      power-on key means for using said data processing device to be turned on into an active state, when said power-on key means is operated;
      reading means for reading the first identification code stored in said first ID code storing means of said memory device, when said power-on key means is operated;
      a processing unit for reading out the application program from said program storing means of said memory device, and for executing the read out application program;
      work memory means coupled to said processing unit for executing the read out application program;
      second ID code storing means for storing a second identification code corresponding to an application program of a memory device which was previously connected with said data processing device;
      comparing means for comparing the second identification code stored in said second ID code storing means with the first identification code read by said reading means to determine whether the first and second identification codes coincide with each other; and
      controlling means having:
         clearing means for, when said comparing means determines that the first and second identification codes do not coincide with each other, clearing said work memory means; and
         means for, when said comparing means determines that the first and second identification codes do not coincide with each other, transferring the first identification code read by said reading means to said second ID code storing means, to store the first identification code in said second ID code storing means as a fresh second identification code in place of the second identification code previously stored in said second ID code storing means;
      whereby when said comparing means determines that first and second identification codes coincide with each other, said work memory means is not cleared and data stored therein is used for execution or an application program stored in a memory device which is currently installed in said data processing device.

2. A data processing system according to claim 1, wherein:
   said memory device has a shape of a card; and
   said data processing device includes a loading unit for detachably receiving and storing said memory device when said memory device is detachably installed in said data processing device.

* * * * *

UNITED STATES PATENT AND TRADEMARK OFFICE
CERTIFICATE OF CORRECTION

PATENT NO. : 5,390,331
DATED : February 14, 1995
INVENTOR(S) : YUI

It is certified that error appears in the above-indentified patent and that said Letters Patent is hereby corrected as shown below:

In the Title Page:

Under Section [56] References Cited,

Delete "FOREIGN PATENT DOCUMENTS
        0155690   9/1985   European Pat.Off. .
        1930338  12/1970   Germany ."

Delete "OTHER PUBLICATIONS
        European Search Report.
        Patent Abstracts of Japan, vol. 7, No. 231
        (p. 229)-J-P-A-58 120 247."

Signed and Sealed this

Thirtieth Day of April, 1996

Attest:

BRUCE LEHMAN

*Attesting Officer*    *Commissioner of Patents and Trademarks*